United States Patent [19]

Schmadel

[11] Patent Number: 4,774,584
[45] Date of Patent: Sep. 27, 1988

[54] HIGH-VOLTAGE POWER SUPPLY FOR A PICTURE TUBE

[75] Inventor: Karl-Hans Schmadel, Diekholzen, Fed. Rep. of Germany

[73] Assignee: Blaupunkt-Werke GmbH, Hildesheim, Fed. Rep. of Germany

[21] Appl. No.: 944,748

[22] Filed: Dec. 22, 1986

[30] Foreign Application Priority Data

Dec. 21, 1985 [DE] Fed. Rep. of Germany ....... 3545627

[51] Int. Cl.$^4$ .............................................. H04N 5/63
[52] U.S. Cl. ..................................... 358/190; 363/21; 315/411
[58] Field of Search ........................ 358/190, 74, 243; 315/411, 386; 363/21

[56] References Cited

U.S. PATENT DOCUMENTS

| 3,889,173 | 6/1975 | Klusmann et al. | 363/21 X |
|---|---|---|---|
| 3,924,172 | 12/1975 | Gregorich | 363/21 |
| 4,172,277 | 10/1979 | Pinson | 363/21 X |
| 4,210,947 | 7/1980 | Koizumi | 363/21 X |
| 4,236,198 | 11/1980 | Ohsawa et al. | 363/21 X |
| 4,316,128 | 2/1982 | Shiratsuchi | 315/411 |
| 4,321,514 | 3/1982 | Thibodeau et al. | 358/190 X |
| 4,330,816 | 5/1982 | Imazeki et al. | 363/21 X |
| 4,347,559 | 8/1982 | Sturgeon | 363/21 |
| 4,371,917 | 2/1983 | Bator | 363/21 |
| 4,466,051 | 8/1984 | Fitzgerald | 363/21 |
| 4,524,411 | 6/1985 | Willis | 358/190 |
| 4,527,229 | 7/1985 | Imamura et al. | 315/411 X |
| 4,562,508 | 12/1985 | Chen et al. | 315/411 X |
| 4,692,852 | 9/1987 | Hoover | 315/411 X |
| 4,728,868 | 3/1988 | Ishikawa et al. | 358/190 X |
| 4,737,853 | 4/1988 | Graves et al. | 358/190 |

FOREIGN PATENT DOCUMENTS 3602005 7/1986 Fed. Rep. of Germany ...... 358/190

OTHER PUBLICATIONS

Peter Knight, RCA Publication, "Television Receiver Power Supply Converter Circuit", Nov. 23, 1981, pp. 1-2.

Primary Examiner—James J. Groody
Assistant Examiner—E. Anne Faris
Attorney, Agent, or Firm—Frishauf, Holtz, Goodman & Woodward

[57] ABSTRACT

The primary winding of a high-voltage transformer is periodically connected to an operating voltage source at the television line scanning frequency. The secondary winding is subdivided into several component windings which are connected to each other through diodes. A further diode provides the output for the high voltage. A somewhat similar circuit with interposed diodes can provide a center tap and full-wave rectification. A control voltage derived by voltage division from the high voltage is supplied to regulating means for holding the high voltage constant by controlling the width of the driving pulses for the semiconductor switch or by directly controlling the operating voltage connected to the transformer through the semiconductor switch.

12 Claims, 2 Drawing Sheets

HIGH-VOLTAGE POWER SUPPLY FOR A PICTURE TUBE

The invention concerns a high-voltage power supply of the kind utilizing a transformer operating for example at the line scanning frequency.

The picture tubes of television sets, video monitors, data display devices and the like require an operating voltage of the order of magnitude of 15 to 25 kV. Various different types of circuits have become known for generating such a high D.C. voltage for producing the beam current. The combination of the generation of the high voltage with the horizontal deflection circuit is the most widespread kind of high-voltage supply for picture tubes.

With such a high-voltage supply, however, independent control of the high voltage and of the picture width can be achieved only with difficulty. The provision of separate circuits for generating the high voltage and for horizontal deflection does make possible separate control of the high-voltage and of the horizontal deflection, but the known circuits of that kind involve substantial expense, however.

SUMMARY OF THE INVENTION

It is an object of the present invention to provide a circuit for generating high voltage for the picture tube in which, without any great expense, the high voltage can be well adjusted or controlled and voltage without undesired effects on the picture width, even if the high voltage transformer is made to operate at the line scanning frequency.

Briefly, the primary winding of a high-voltage transformer is periodically connected to an operating voltage source over a semiconductor switch, while the secondary winding is subdivided into several partial windings which are connected to each other through diodes. A further diode is connected between one partial secondary winding and the high-voltage output terminal. A voltage divider is connected to the high-voltage output terminal. From a tap near the low voltage end of the voltage divider a control or regulating voltage is available and is supplied to a regulation or control circuit for maintaining the high voltage constant.

It is particularly advantageous to constitute the regulation or control circuit for the high voltage as a pulse width modulator and to utilize it for switching the semiconductor switch on and off. In that way the cost of the power supply is to a great extent reduced and the manufacture of a compact component group for generating a high voltage for operating a picture tube is made possible.

It is also desirable that the voltage converter circuit consisting of the transformer, the semiconductor switch, the diodes and at least one caPacitor should be designed so that during the non-conducting phases of the semiconductor switch an approximately sinusoidal oscillation is produced.

It is useful for the secondary winding to have an even number of component windings which are connected in series, with a center tap being provided at the connection of two of the successive windings, away from which there will be alternately a partial winding and a diode in series in both directions, with the electrodes of the last diodes which are facing away from the windings being connected together to provide the high-voltage terminal.

It is preferred for the circuit to be designed to provide a pulse width applied to the windings of the transformer which is less than 50% of the pulse cycle.

BRIEF DESCRIPTION OF THE DRAWINGS

The invention is further described by way of illustrative example with reference to the several figures of the annexed drawings, in which.

Substantially identical components are provided with the same reference numerals in the various figures.

DESCRIPTION OF THE ILLUSTRATED EMBODIMENTS

Figure 1:
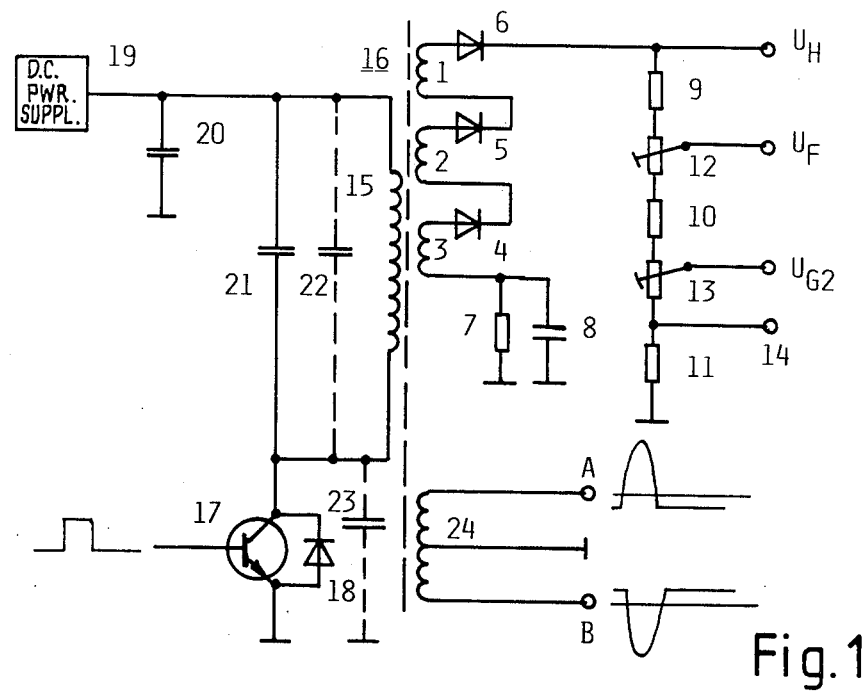
FIG. 1 is a block circuit diagram of a high-voltage converter in which a pulsed voltage is transformed to produce high voltage.

The high-voltage converter circuit illustrated in FIG. 1 is a so-called diode-split-transformer in which the secondary winding is subdivided in several component coils 1, 2 and 3 which are connected in series with each other by diodes 4, 5, 6. The low-voltage end of the winding 3 is connected through a resistance 7 and a capacitance 8 to ground potential. At the ungrounded end of the resistance 7 a voltage is available corresponding in a known way to the space current $I_s$ of the picture tube which is usable for regulation purposes or for activating an electronic safety provision in the case of a short circuit in the high-voltage circuit. The high voltage $U_H$ can be taken off at the cathode of the diode 6. A voltage divider is connected to the diode 6 that is made in part out of the fixed resistances 9, 10 and 11 and in part out of adjustable potentiometers 12 and 13. The adjustable taps of the adjustment potentiometers 12 and 13 provide the voltage $U_F$ for the focussing and the screen grid voltage $U_{G2}$ of the picture tube.

Figure 3:
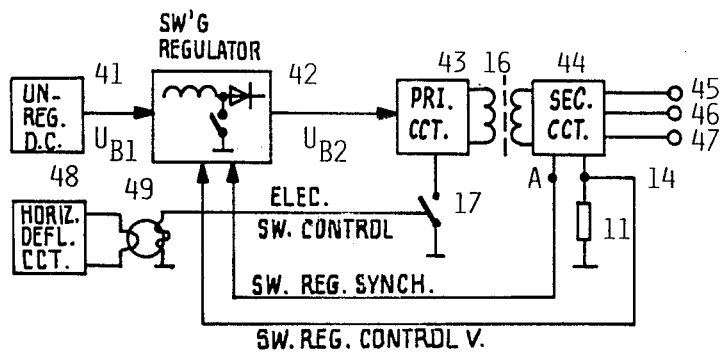
FIG. 3 is a block circuit diagram of another circuit according to the invention, and FIGS. 4a and 4c respectively show a number of simplified block circuit diagrams for explanation of the possibilities of regulating the high voltage according to various elaborations of the invention.

At the circuit point 14 a regulating voltage can be taken off which is proportional to the high voltage $U_H$ and can be used for control of the high voltage to hold that voltage constant (FIG. 3 and FIG. 4).

The primary winding 15 of the transformer 16 is periodically connected to the operating voltage by way of the semiconductor switch 17, the switching path of which is in parallel with a free-wheeling diode 18. The semiconductor switch 17 is supplied with pulses at its control input which are preferably of the line scanning frequency, the preference being very simply based on the easy availability of line frequency pulses. The operating voltage is delivered by an operating voltage source 19 which is capacitively shunted to ground through a capacitor 20. Another capacitor 21 is connected in parallel to the primary winding. Circuit capacitances which are to be taken into account are indicated at 22 and 23, with broken lines indicating that these are "stray" or inherent capacitances and not separate components.

The transformer 16 also has a winding 24 having a center tap that is grounded and terminals A and B from which oppositely phased pulses can be obtained.

The circuit of FIG. 1 operates in a manner similar to that of a deflection circuit, i.e. during the non-conducting phase of the operation cycle of the semiconductor switch 17 the current through the primary winding rises somewhat linearly with time from one peak value to the other, then changes its polarity relatively quickly during the blocked interval of the semiconductor switch 17, at which time a relatively high-voltage pulse is produced and then begins anew to execute a linear rise first through the diode 18 and then through the semiconductor switch 17. The voltage pulses are then carried over to the secondary winding and rectified in circuit therewith to produce the high voltage $U_H$. Control of the high voltage is possible by controlling the width of the driving pulses.

Figure 2:
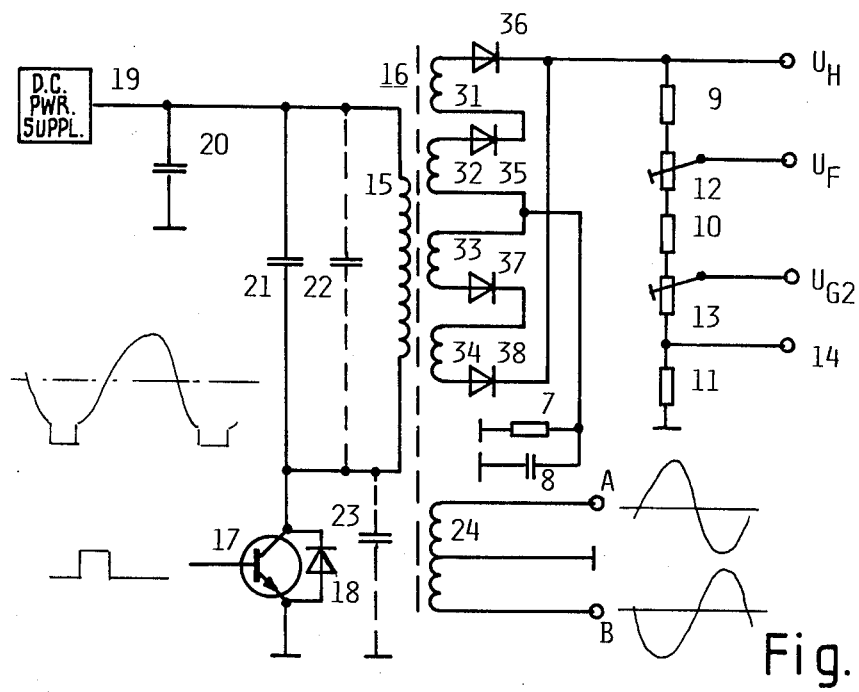
FIG. 2 is a circuit block diagram of a high-voltage converter in which a sinusoidal voltage is transformed to produce the high voltage.

Another high-voltage converter usable in accordance with the present invention is shown in FIG. 2. The basic construction and design is similar to that of the high-voltage converter of FIG. 1, so that in what follows only the distinguishing differences are explained. In the voltage converter of FIG. 2, the time constants which are provided by the action of the capacitors and inductances are so designed that during the non-conducting interval of the semiconductor switch 17 a somewhat sinusoidal oscillation is produced. In consequence, a sinusoidal voltage is also induced in the secondary winding. In rectification both half-waves of the sinusoidal voltage are utilized. An even number of component windings 31, 32, 33 and 34 are accordingly provided, with the connection together of the component windings 32 and 33 forming a center tap which is connected to ground potential through the resistance 7 and through the capacitance 8 in parallel with that resistance.

The windings 31 and 32 and the diodes 35 and 36 respectively serve for generating and rectifying one half-wave, while the component windings 33 and 34 as well as the diodes 37 and 38 serve to generate and rectify the other half-wave. At the terminals A and B of the supplementary winding 24 there appear sinusoidal voltages instead of the pulse-shaped voltages. In the circuit of FIG. 2, like in the circuit FIG. 1, it is possible to control the high voltage by way of the keying ratio of the driving pulses supplied to the semiconductor switch 17.

In the circuit according to the invention illustrated in the circuit block diagram of FIG. 3, an unregulated operating voltage $U_{B1}$ is obtained from a unit 41 plugged into an electric power outlet. From that operating voltage a controllable voltage $U2_{B2}$ is derived, by means of a switching regulator, which is supplied to the high-voltage converter as operating voltage. The circuits respectively explained in connection with FIGS. 1 and 2 are suitable for the high-voltage converter of FIG. 3. In FIG. 3, such a high-voltage converter is designated merely diagrammatically by a primary portion 43, a transformer 16, a semiconductor switch 17 and a secondary portion 44. The voltage drop across the resistance 11 is supplied to the switching regulator 42 as a control voltage. In addition the pulsed or sinusoidal alternating voltage from the connection A is supplied to the switching regulator 42 for synchronizing it. This has the advantage that if there is a failure in generation of the high voltage, for example by a short circuit, the switching regulator 42 will also be switched off.

The high voltage, the focussing voltage and the screen grid voltage are respectively available for the picture tube at the terminals 45, 46 and 47. In FIG. 3 there is also shown a further development of the invention by which the semiconductor switch 17 is controlled by means of the horizontal deflection circuit 48. In this case a current/voltage converter 49 is connected between the output of the horizontal deflection circuit 48 and the control input of the semiconductor switch 17. The current/voltage converter 49 generates a voltage corresponding to the deflection current. To the extent that an interruption takes place in the deflection current circuit, no drive is produced for the switch 17 when there is a failure of the horizontal deflection circuit, so that the high voltage is also switched off. The current/voltage converter 49 can be a transformer-type converter as indicated in FIG. 3, but it is also possible to utilize a resistance connected in series with the deflection coils as a current/voltage converter.

Figure 4A:
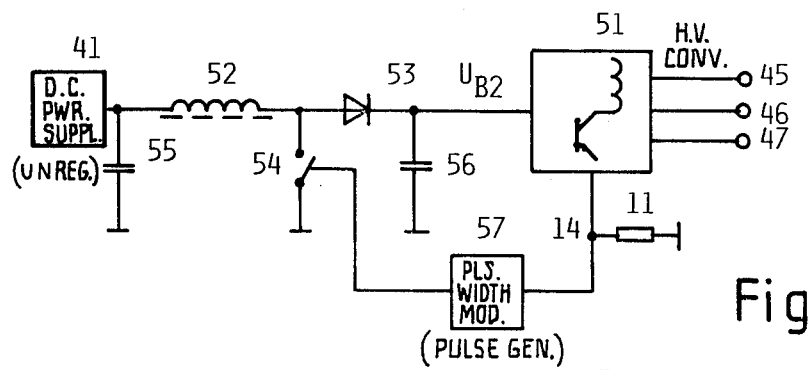
Figure 4B:
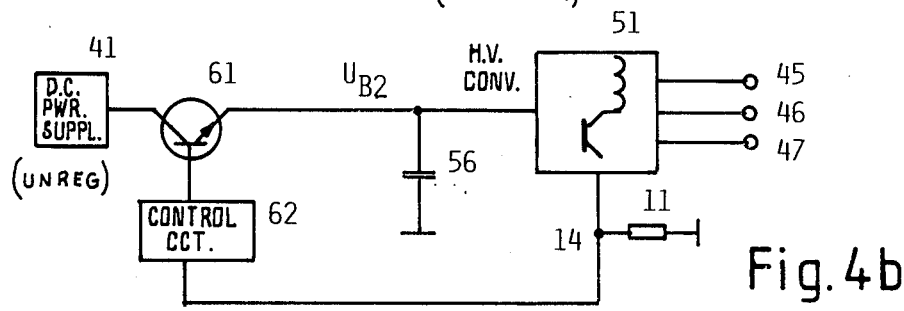
Figure 4C:
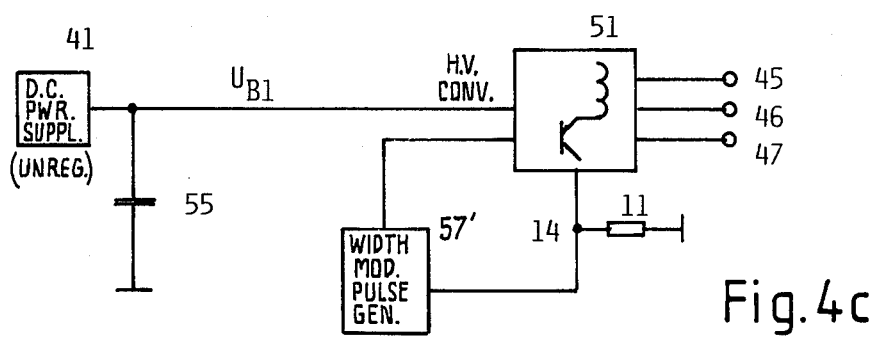

Greatly simplified circuit block diagrams are illustrated in FIGS. 4a, 4b and 4c to illustrate various ways of regulating the voltage within the scope of the invention. In the circuit of FIG. 4a, a switching regulator is provided between the commercial power line fed portion 41 and the high-voltage converter 51. This switching regulator consists of an inductance 52, a diode 53 and a semiconductor switch 54. Both the unregulated output voltage of the plugged in power supply and the output of the switching regulator are filtered to ground by capacitors 55 and 56 respectively. A pulse width modulator 57 is connected between the output 14 of the high-voltage converter and a control input for the semiconductor switch 54. The operating voltage $U_{B2}$ of the high-voltage converter 51 is thereby regulated in the sense tending to hold the high voltage at a constant value.

In the illustrated example shown in FIG. 4b, the operating voltage $U_{B2}$ of the high-voltage converter 51 is likewise regulated, in this case by a transistor 61 operating as a series regulator. The base of the transistor 61 is controlled in a known way over a control circuit 62 in a manner dependent on the regulating voltage taken at 14 from the high-voltage converter 51.

In the case of the example illustrated in FIG. 4c, the high-voltage converter 51 is supplied with an unregulated voltage $U_{B1}$ from the power line circuit 41. The control voltage for regulating the high voltage is taken from the output 14 of the high-voltage converter and is supplied to a pulse width modulator 57, which serves as the driver for the semiconductor switch 17 (FIG. 1) in the high-voltage converter 51.

Although the invention has been described with reference to several illustrative embodiments, it will be recognized that further modifications and variations may be possible within the inventive concept.

I claim:

1. Circuit for producing a high voltage for operation of a picture tube, comprising:
   a transformer (16) having a primary winding and a primary winding circuit including a source of operating voltage (19) and a semiconductor switch (17) connected in series between said primary winding and said source of operating voltage for periodic connection of said transformer primary winding to said operating voltage source, said transformer also having a secondary winding subdivided into several component windings (1, 2, 3; 31, 32, 33, 34)

connected together at least in some cases through diodes (4, 5; 35, 37);

at least one additional diode (6; 36, 38) being provided between a component winding (1; 31, 34) and an output terminal for providing a high voltage, a voltage divider (9, 10, 11, 12, 13) connected between said output terminal for high voltage and a ground connection and having a first adjustable output for suppluing focussin voltage, a second adjustable output for providing screen grid voltage and in addition a third fixed output (14) for supplying a control voltage, which third output is electrically nearer said ground connection than are said first and second outputs of said voltage divider, and means for regulating said high voltage towards constancy in response to said control voltage.

2. Circuit according to claim 1, wherein said regulating means (57) contains a pulse width modulator and operates to produce driving pulses for said semiconductor switch (17).

3. Circuit according to claim 2, wherein a voltage converter is constituted by said transformer (16), said semiconductor switch (17) and said diodes, and wherein pulses having a pulse width smaller than 50% of the cycle of pulses produced by said pulse width modulator are provided in the windings of said transformer (16).

4. Circuit according to claim 1, wherein said regulating means is a switching regulator (52, 53, 54, 57) which is inserted in the supply of operating voltage to the transformer and includes a pulse width modulator (57).

5. Circuit according to claim 1, wherein said regulating means is a series regulator (61, 62) interposed in the supply of operating voltage to said transformer primary winding.

6. Circuit according to claim 1, wherein means are provided for deriving pulses from a horizontal deflection current of said television tube for application as driving pulses to said semiconductor switch (17).

7. Circuit according to claim 6 wherein a current/voltage converter (49) through which horizontal deflection current of said picture tube is caused to flow is used for derivation of driving pulses for said semiconductor switch (17).

8. Circuit for producing a high voltage for operation of a picture tube, comprising:

a transformer (16) having a primary winding and a primary winding circuit including a source of operating voltage (19), a semiconductor switch (17) connected in series between said primary winding and said source of operating voltage for periodic connection of said transformer primary winding to said operating voltage source, and at least one capacitor (21), said transformer also having a secondary winding subdivided into several component windings (31, 32, 33, 34) connected together at least in some cases through diodes, at least one additional diode (36, 38) being provided between a component winding (31, 34) and an output terminal for providing a high voltage, said transformer, said semiconductor switch, said diodes and said at least one capacitor consituting a voltage converter wherein, during non-conducting phases of said semiconductor switch (17), an approximately sinusoidal oscillation takes place;

a voltage divider (9, 10, 11, 12, 13) connected to said output terminal for high voltage and having an output (14) for supplying a control voltage, and means for regulating said high voltage towards constancy in response to said control voltage.

9. Circuit according to claim 8, wherein said secondary winding has an even number of said component windings which are connected in series, and in which the connection of one of said windings directly to another of them provides a center tap, and from said center tap in each direction there are connected alternately in series a component winding, one of said diodes, another component winding and another one of said diodes, with the diode electrodes which are most remote from said center tap being connected together to provide said output for high voltage.

10. Circuit according to claim 9, wherein a voltage converter is constituted by said transformer (16), said semiconductor switch (17) and said diodes, wherein said regulator means (57') contains a pulse width modulator and operates to produce driving pulses for said semiconductor switch and wherein pulses having a pulse width smaller than 50% of the cycle of pulses produced by said pulse width modulator are provided in the windings of said transformer (16).

11. Circuit according to claim 9, wherein means are provided for deriving pulses from a horizontal deflection current of said television tube for application as driving pulses to said semiconductor switch (17).

12. Circuit according to claim 9, wherein a current to voltage converter (49) through which horizontal deflection current of said picture tube is caused to flow is used for derivation of driving pulses for said semiconductor switch (17).

* * * * *